(12) United States Patent
Taguchi et al.

(10) Patent No.: US 7,364,713 B2
(45) Date of Patent: Apr. 29, 2008

(54) RAW MATERIAL POWDER FOR MOLDING OXIDE ION CONDUCTOR, AND METHOD FOR MANUFACTURING THE SAME

(75) Inventors: Hisatomi Taguchi, Nagoya (JP); Atsushi Fukaya, Obu (JP); Shigeo Nagaya, Nagoya (JP); Kiyoshi Komura, Nagoya (JP); Kiichi Hirano, Nagoya (JP); Hiroshi Tenjikukatsura, Nagoya (JP)

(73) Assignees: Noritake Co., Limited, Nagoya (JP); Chubu Electric Power Co., Inc., Nagoya (JP); KCM Corporation, Nagoya (JP)

( * ) Notice: Subject to any disclaimer, the term of this patent is extended or adjusted under 35 U.S.C. 154(b) by 24 days.

(21) Appl. No.: 10/505,120

(22) PCT Filed: Feb. 10, 2003

(86) PCT No.: PCT/JP03/01353

§ 371 (c)(1),
(2), (4) Date: Oct. 26, 2004

(87) PCT Pub. No.: WO03/068706

PCT Pub. Date: Aug. 21, 2003

(65) Prior Publication Data

US 2005/0124484 A1   Jun. 9, 2005

(30) Foreign Application Priority Data

Feb. 18, 2002   (JP) .............................. 2002-040415

(51) Int. Cl.
*C01F 17/00* (2006.01)

(52) U.S. Cl. .............. 423/263; 252/519.1; 252/519.12; 252/519.15

(58) Field of Classification Search ................ 423/263; 525/519.1, 519.12, 519.15
See application file for complete search history.

(56) References Cited

U.S. PATENT DOCUMENTS

| | | | |
|---|---|---|---|
| 4,627,966 A * | 12/1986 | Micheli ...................... | 423/263 |
| 5,240,480 A | 8/1993 | Thorogood et al. | |
| 5,261,932 A | 11/1993 | Carolan et al. | |
| 5,306,411 A | 4/1994 | Mazanec et al. | |
| 5,356,728 A | 10/1994 | Balachandran et al. | |
| 5,681,373 A | 10/1997 | Taylor et al. | |
| 5,712,220 A | 1/1998 | Carolan et al. | |
| 5,817,597 A | 10/1998 | Carolan et al. | |
| 5,908,800 A * | 6/1999 | Bonneau et al. ............. | 501/103 |
| 6,056,807 A | 5/2000 | Carolan et al. | |
| 6,090,500 A | 7/2000 | Ishihara et al. | |
| 6,586,127 B1 | 7/2003 | Ishihara et al. | |
| 2002/0013214 A1 | 1/2002 | Kuroda et al. | |

FOREIGN PATENT DOCUMENTS

| | | |
|---|---|---|
| JP | A 56-092103 | 7/1981 |
| JP | A 6-198149 | 7/1994 |
| JP | A 6-219861 | 8/1994 |
| JP | A 8-276112 | 10/1996 |
| JP | A 9-235121 | 9/1997 |
| JP | A 9-299749 | 11/1997 |
| JP | A 10-114520 | 5/1998 |
| JP | A 11-253769 | 9/1999 |
| JP | A 11-335164 | 12/1999 |
| JP | A 11-335165 | 12/1999 |
| JP | A 2000-154060 | 6/2000 |
| JP | A 2000-351669 | 12/2000 |
| JP | A 2001-093325 | 4/2001 |
| JP | A 2001-106532 | 4/2001 |
| JP | A 2002-293539 | 10/2002 |

OTHER PUBLICATIONS

Chemical Principles, Masterton, et. al., 4th Ed., 1977, p. 404.*
English-language translation of Oct. 22, 2007 Office Action regarding JP-A-2002-040415.

* cited by examiner

*Primary Examiner*—Steven Bos
(74) *Attorney, Agent, or Firm*—Oliff & Berridge, PLC

(57) ABSTRACT

It is an object of the present invention to provide a raw material powder for stably obtaining a dense sinter that is prevented from cracking, and a method for manufacturing this powder, and a method for manufacturing a lanthanum-based oxide ion conductor in which this raw material powder is used.

The raw material powder manufacturing method of the present invention is a method for manufacturing a raw material powder for forming an oxide ion conductor composed of a multi-component metal oxide including lanthanum or lanthanide, wherein a mixed powder blended such that all of the elements constituting said multi-component metal oxide are included is prefired, after which this prefired powder is exposed to water or moist gas so as to expand at least some of the particles in said powder. Alternatively, two types of mixed powder with different components are prefired separately, after which the prefired powders are blended in a specific ratio.

3 Claims, 2 Drawing Sheets

RAW MATERIAL POWDER FOR MOLDING OXIDE ION CONDUCTOR, AND METHOD FOR MANUFACTURING THE SAME

TECHNICAL FIELD

This invention relates to a method for manufacturing an oxide ion conductor for selectively transmitting oxide ions, and more particularly relates to a method for manufacturing an oxide ion conductor composed of a multi-component metal oxide (composite oxide) containing lanthanoid such as lanthanum, and to a raw material powder for forming an oxide ion conductor used in said manufacturing method, and to a method for manufacturing this powder.

BACKGROUND ART

There are known inorganic materials (oxide ion conductors) having the property of selectively transmitting oxide ions at high temperature (such as 500° C. or higher). Sinters of multi-component metal oxides including lanthanum or lanthanide (hereinafter also referred to as "lanthanum-based oxide ion conductors"), such as an $LaSrCoO_3$-based composite oxide or an $LaGaO_3$-based composite oxide, are known as oxide ion conductors with particularly high oxygen transmission performance. These lanthanum-based oxide ion conductors can be utilized in applications such as separating oxygen from a mixed gas containing oxygen. Some oxide ion conductors are both oxide ion conductive and electron conductive (the meaning of which includes hole conductivity). Such oxide ion conductors are also called electron-oxide ion mixed conductors (hereinafter also referred to simply as "mixed conductors").

Types of lanthanum-based oxide ion conductors, and how they are used, are discussed, for example, in the specifications of Japanese Laid-Open Patent Applications 2001-106532, 2001-93325, 2000-154060, H11-335164, H11-335165, H10-114520, H9-299749, and S 92103, Japanese Patents 2,993,639 (Japanese Laid-Open Patent Application H11-253769), 2,966,341 (Japanese Laid-Open Patent Application H9-235121), 2,966,340 (Japanese Laid-Open Patent Application H8-276112), 2,813,596 (Japanese Laid-Open Patent Application H6-219861), and 2,533,832 (Japanese Laid-Open Patent Application H6-198149), and U.S. Pat. Nos. 5,306,411 and 5,356,728.

Lanthanum-based oxide ion conductors are generally manufactured by a solid phase reaction method (see the examples (manufacturing examples) in the various publications listed above). This is because the cost is higher and fewer types of starting raw material can be used with a liquid phase reaction method.

With a solid phase reaction, a mixed powder is prepared by mixing a number of types of metal compound (oxides or various salts) so that all of the elements constituting the oxide ion conductor will be included. The mixed powder is then prefired within a predetermined temperature range. Molding the prefired powder thus obtained into a predetermined shape and firing it (hereinafter referred to as "main firing") yields an oxide ion conductor (sinter) of the desired shape.

In order to ultimately obtain a dense sinter (that is, a sinter with a structure dense enough to ensure gas impermeability) in the manufacture of an oxide ion conductor (sinter) by means of a solid phase reaction, it is preferable for the raw material powder that makes up the molded article subjected to the main firing to have higher activity (sintering reactivity). Accordingly, the temperature at which the mixed powder is prefired is set relatively low (800 to 1000° C., for instance).

However, while the activity (sintering reactivity) of the raw material powder will be high if the mixed powder prefiring temperature is low, unreacted particles that have not undergone prefiring (hereinafter referred to as "impurities") tend to remain behind in the powder. These impurities can bring about a chemical reaction that leads to a significant change in volume during the main firing of the molded article. For example, they can bring about a volumetric change in which first swells and then contracts under predetermined conditions.

If such impurities are present in a large quantity in the prefired powder, cracks tend to develop in the oxide ion conductor (sinter). Cracking is undesirable in an oxide ion conductor, because gas can pass non-selectively through these cracks and thereby through the oxide ion conductor, the result of which is a decrease in the selective oxide ion permeation (separation) performance of the oxide ion conductor.

The present invention was conceived in an effort to solve the above problems encountered in the past in relation to a raw material powder (prefired powder) manufactured by solid phase reaction method. It is an object thereof to provide a raw material powder for stably obtaining a dense sinter (oxide ion conductor) that is prevented from cracking, and a method for manufacturing this powder. It is a further object of the present invention to use this raw material powder to manufacture lanthanum-based oxide ion conductors of various shapes.

DISCLOSURE OF THE INVENTION

The inventors arrived at the present invention upon discovering that marked volumetric change (typically expansion) can occur when impurities such as lanthanum oxide present in the prefired powder react with ambient water during firing, and that this volumetric change can be a cause of cracking.

One invention provided by the present invention is a method for manufacturing a raw material powder for molding an oxide ion conductor composed of a multi-component metal oxide substantially constituted by oxygen and two or more metal elements including at least lanthanum (La) or lanthanide (Ce, Pr, Nd, Pm, Sm, Eu, Gd, Tb, Dy, Ho, Er, Tm, Yb, and Lu), comprising the following steps.

The steps comprised by the present invention are preparing a mixed powder composed of two or more metal compounds blended such that all of the elements constituting the multi-component metal oxide will be included, prefiring the mixed powder, and exposing the prefired powder to water or moist gas so as to expand at least some of the particles (primary particles and/or secondary particles) in the powder.

With this manufacturing method, after the prefired powder has first been cooled after the prefiring treatment, water is intentionally applied to the prefired powder to swell the impurities. This brings about a reaction that results in a change in the volume of the impurities prior to the main firing (hereinafter referred to as "expansion reaction prior to main firing"). In other words, this prevents a pronounced change in the volume of some (i.e., the impurities) of the particles (No particular distinction is made here between primary and secondary particles; and so forth.) that make up the raw material powder during the main firing.

Therefore, this manufacturing method makes it possible to provide a raw material powder that is favorable for manufacturing a dense sinter (an oxide ion conductive ceramic) that is prevented from cracking. This step (the step of expanding at least some of the particles in the powder) is preferably conducted immediately prior to using the raw material powder to mold the oxide ion conductor.

Preferably, the step of expanding at least some of the particles in the powder is conducted by air drying with normal-temperature or heating at 200° C. or lower (typically between room temperature and 200° C.) in moist air (typically in air with a relative humidity of at least 50%, and preferably a relative humidity of at least 80%) until substantially no further weight change is noted in the prefired powder.

With the manufacturing method of this aspect, the expansion reaction of the impurities prior to main firing can be brought about by a simple procedure. Therefore, a raw material powder that is favorable for manufacturing a dense sinter (an oxide ion conductive ceramic) that is prevented from cracking can be manufactured easily and at low cost.

Also, the step of expanding at least some of the particles in the powder is preferably conducted by stirring the prefired powder under wet conditions, and then performing air drying or heating.

With the manufacturing method of this aspect, moisture can be applied uniformly to the entire mixed powder by wet stirring (hereinafter, "wet stirring" encompasses wet grinding unless otherwise specified). The expansion reaction of the impurities prior to main firing can be brought about by subsequent air drying or heating. Accordingly, with this manufacturing method the expansion reaction of the impurities prior to main firing can be made to proceed substantially simultaneously throughout the entire powder. Also, the expansion reaction of the impurities prior to main firing can be brought about consistently throughout the entire powder. Therefore, the manufacturing method in this aspect makes it possible to manufacture a high-quality raw material powder that is favorable for manufacturing a dense sinter (an oxide ion conductive ceramic) that is prevented from cracking.

With the above manufacturing method, it is preferable to use a mixed powder with the following composition.

Specifically, this mixed powder constitutes a multi-component metal oxide represented by the general formula $(Ln_{1-x}A_x)(B_{1-y}Fe_y)O_3$ (where Ln is at least one selected from the group consisting of lanthanum and lanthanides, A is at least one selected from the group consisting of Sr, Ca, and Ba, B is at least one selected from the group consisting of Ga, Ti, Ni, Cu, Co, and Mg, $0<x<1$, and $0 \leq y \leq 1$ (typically, $0<y<1$)), and is prepared so as to contain an oxide of Ln, an oxide of Fe if needed, an oxide and/or salt of the metal A in the above general formula, and an oxide and/or salt of the metal B in the above general formula if needed.

A raw material powder with which a particularly dense sinter (an oxide ion conductive ceramic) can be formed can be manufactured by performing one of the above particle expanding steps on this prefired mixed powder.

Another invention provided by the present invention is a method for manufacturing a raw material powder for molding an oxide ion conductor composed of a multi-component metal oxide substantially constituted by oxygen and two or more metal elements including at least lanthanum or lanthanide, comprising the following steps.

In order to form an oxide ion conductor whose composition is represented by the general formula $(Ln_{1-x}A_x)(B_{1-y}Fe_y)O_3$ (where Ln is at least one selected from the group consisting of lanthanum and lanthanides, A is at least one selected from the group consisting of Sr, Ca, and Ba, B is at least one selected from the group consisting of Ga, Ti, Ni, Cu, Co, and Mg, $0<x<1$, and $0 \leq y \leq 1$ (typically, $0<y<1$)), a step is performed of preparing (1) mixed powder containing an oxide of Ln, an oxide of Fe if needed, and an oxide and/or salt of the metal B in the above general formula if needed, and containing substantially no oxide and/or salt of the metal A, and (2) a mixed powder containing an oxide of Fe if needed and an oxide and/or salt of the metal A, and containing substantially no oxide of Ln. The next step is of separately prefiring these mixed powders of different components. This is followed by a step of mixing the prefired powders in a predetermined ratio.

With the manufacturing method of this aspect, prefired powders with mutually different components as indicated by (1) and (2) above are prepared separately. In other words, with the manufacturing method of this aspect, there is no intermingling of a lanthanoid oxide with an oxide and/or salt of an alkaline earth metal (that is, A) during prefiring. Accordingly, this prevents the generation of impurities that could cause a volumetric change (expansion) during the main firing. Therefore, the manufacturing method of this aspect makes it possible to provide a raw material powder that is favorable for manufacturing a dense sinter (an oxide ion conductive ceramic) that is prevented from cracking.

With the manufacturing method constituted as above, it is preferable if the blending step is performed by mixing the prefired mixed powder of (1) with the prefired mixed powder of (2) under wet conditions, and this is followed by air drying or heating.

Using a raw material powder obtained by the manufacturing method of this aspect makes possible the stable manufacture of a highly dense sinter (oxide ion conductive ceramic).

A raw material powder for forming an oxide ion conductor that can be favorably manufactured by one of the manufacturing methods constituted as above is such that Ln in the above general formula is La, A is Sr, and B is Ga or Ti.

With the manufacturing method of this aspect, it is possible to provide a dense sinter (an oxide ion conductive ceramic) that has excellent oxide ion conductivity and high gas impermeability.

As another aspect for solving the stated problems, the present invention also provides a raw material powder for forming an oxide ion conductor, obtained by the various manufacturing methods discussed above.

As discussed above, with the raw material powder provided by the present invention, expansion reaction of the impurities prior to main firing has already been carried out in the course of the manufacture of the raw material powder. Accordingly, this raw material powder can be used to form and manufacture a dense sinter (an oxide ion conductive ceramic) that has excellent oxide ion conductivity and high gas impermeability.

As another aspect for solving the stated problems, the present invention also provides a method for manufacturing an oxide ion conductive ceramic by using a raw material powder for forming an oxide ion conductor obtained by the manufacturing method of the present invention as discussed above.

Specifically, the method for manufacturing an oxide ion conductive ceramic provided by the present invention is a method for manufacturing an oxide ion conductor composed of a multi-component metal oxide substantially constituted by oxygen and two or more metal elements including at least lanthanum or lanthanide, comprising molding into a predetermined shape a raw material powder for molding an oxide ion conductor manufactured by the manufacturing method of the present invention as discussed above, and firing this molded article (main firing).

With the method of the present invention for manufacturing an oxide ion conductor, it is possible to manufacture a highly-dense lanthanum-based oxide ion conductor in which substantially no cracks are present.

BEST MODE FOR CARRYING OUT THE INVENTION

Figure 1:
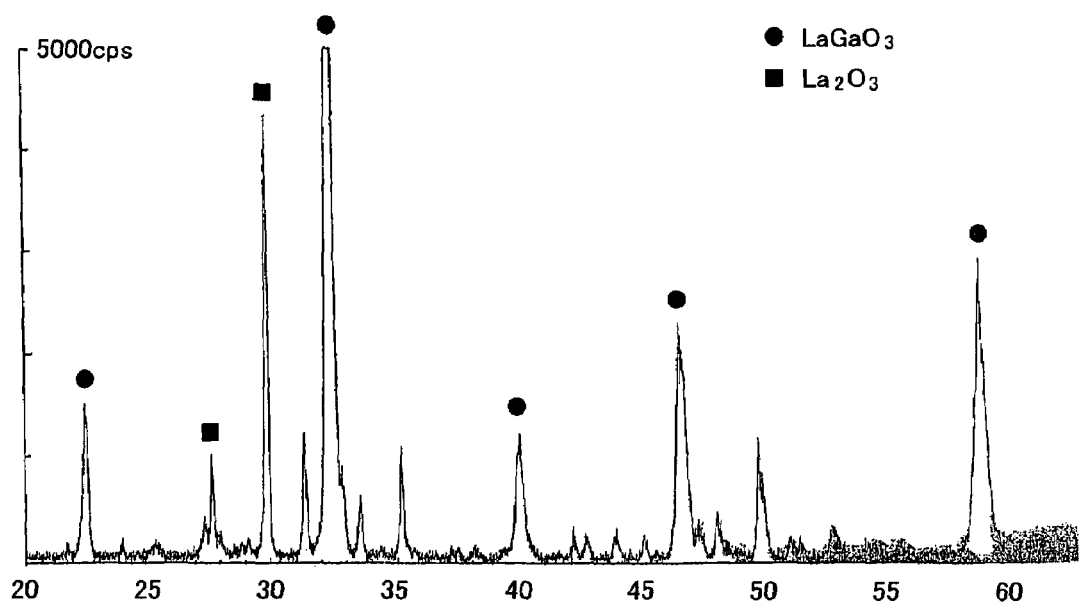
FIG. 1 is a chart showing the results of XRD analysis of the raw material powder of Comparative Example 1.

Preferred embodiments of the present invention will now be described.

The present invention relates to technology for the manufacture of a raw material powder (a prefired mixed powder) used to mold a lanthanum-based oxide ion conductor (oxide ion conductive ceramic) containing at least lanthanum or lanthanide, and there are no particular restrictions on the type or composition of the raw material powder as long as it allows the manufacture of a multi-component metal oxide (oxide ion conductor) with suppressed cracking.

Typically, a raw material powder for obtaining a multi-component metal oxide represented by the general formula a: $(Ln_{1-x}A_x)(B_{1-y}Fe_y)O_3$ can be manufactured with the present invention.

The number of oxygen atoms is expressed as 3 in General Formula a, but actually the number of oxygen atoms is 3 or less (and typically less than 3). However, the number of oxygen atoms varies with the type of elements A to C, the value of x and y, and other conditions, and is therefore difficult to express accurately. In view of this, the number of oxygen atoms is, for the sake of convenience, expressed as 3 in the general formula indicating the multi-component metal oxide in this Specification, but this is not intended to limit the technological scope of the invention taught herein. Therefore, this number of oxygen atoms can also be written as 3-z (so that the above General Formula a is expressed as $(Ln_{1-x}A_x)(B_{1-y}C_y)O_{3-z}$, for example). z here is typically a positive number not greater than 1 (0<z<1).

In General Formula a above, Ln is at least one selected from the group consisting of lanthanum and lanthanides, A is at least one selected from the group consisting of Sr, Ca, and Ba, C is at least one metal selected from the group consisting of Ga, Ti, Ni, Cu, Co, Mg, and Fe, B is one or more metals selected from the group consisting of Ga, Ti, Ni, Cu, Co, Mg, and Fe (but excluding the element selected for C), 0<x<1, and 0≦y≦1 (typically 0<y<1).

Ln is preferably La, Ce, Pr, Nd, or Sm, with La being particularly favorable. The metal element A in General Formula a is typically just one element (preferably Sr), but can also be two or three elements. In this case, the combined stoichiometric ratio for the plurality of A's (such as A1 and A2) becomes x (example: $(Ln_{1-x}A1_{x1}A2_{x2})(B_{1-y}C_y)O_3$, x1 +x2 =x).

The metal element B in General Formula a is typically just one element (preferably Ga, Ti, Mg, or Co), but can also be two or more elements. In this case, the combined stoichiometric ratio for the plurality of B's (such as B1 and B2) becomes 1-y (example: $(Ln_{1-x}A_x)(B1_{z1}B2_{z2}C_y)O_3$, z1+z2=1-y). For instance, it is preferable if C in General Formula a Fe or Co, and B is Ga or Ti (one element), or if C is Fe or Co, and B is a combination of Ga and Mg or Ti and Mg (two elements).

A favorable example of the multi-component metal oxide manufactured with the present invention is a raw material powder of a multi-component metal oxide represented by the General Formula b: $(Ln_{1-x}A_x)(B_{1-y}Fe_y)O_3$ (where Ln is at least one selected from the group consisting of lanthanum and lanthanides, A is at least one selected from the group consisting of Sr, Ca, and Ba, B is at least one selected from the group consisting of Ga, Ti, Ni, Cu, Co, and Mg, 0<x<1, and 0≦y≦1 (typically 0<y<1)). Ln is preferably La, Ce, Pr, Nd, or Sm, with La being particularly favorable.

The metal element A in General Formula b is typically just one element (preferably Sr), but can also be two or three elements. In this case, the combined stoichiometric ratio for the plurality of A's (such as A1 and A2) becomes x (example: $(Ln_{1-x}A1_{x1}A2_{x2})(B_{1-y}Fe_y)O_3$, +x2=x). The metal element B in General Formula b is typically just one element (preferably Ga, Ti Co), but can also be two or more elements. In this case, the combined stoichiometric ratio for the plurality of B's (such as B1 and B2) becomes 1-y (example: $(Ln_{1-x}A_x)(B1_{z1}B2_{z2}Fe_y)O_3$, z1+z2=1-y).

There are no particular restrictions on the value of x in the above General Formulas a and b as long as 0<x<1. x is a value indicating the proportion in which Ln has been substituted with an alkaline earth metal (A) in the lanthanum-based oxide ion conductor (typically a perovskite structure), and preferably 0.01≦x≦0.95. If the value of x is small (such as x=0.1 to 0.3), cracks will tend to develop during the main firing, but when the mixed powder (prefired powder) obtained by the manufacturing method of the present invention is used, the result will be a lanthanum-based oxide ion conductor that is resistant to cracking even when the value of x is relatively small.

Therefore, the manufacturing method of the present invention is particularly favorable for manufacturing a raw material powder constituting a multi-component metal oxide in which 0.01≦x≦0.6 (and even more preferably, 0.05≦x≦0.5) in General Formulas a and b above.

There are no particular restrictions on the value of y in General Formulas a and b above as long as 0≦y≦1 (typically 0<y<1) is satisfied.

Next, the powder manufacturing method of the present invention will now be described in detail. A person skilled in the art will be able to grasp as prior art design details any matters necessary to the working of the powder manufacturing method of the present invention other than those mentioned in this Specification (such as weighing and blending of the various powder raw materials). The present invention can be worked on the basis technological common knowledge in this field and the details disclosed by the Specification and Drawings herein.

With the powder manufacturing method of the present invention, various metal compounds are mixed in a predetermined ratio by a suitable method in order to create the multi-component metal oxide to be manufactured. Examples of these metal compounds include oxides of metal elements constituting a multi-component metal oxide that becomes an oxide ion conductor (ceramic), and compounds that can become such oxides when heated (such as carbonates, nitrates, sulfates, phosphates, acetates, oxalates, halides, hydroxides, and oxyhalides of metal elements).

For instance, when the multi-component metal oxide to be manufactured is represented by the above General Formula b: $(Ln_{1-x}A_x)(B_{1-y}Fe_y)O_3$ an oxide of Ln, an oxide of Fe, an oxide and/or salt of the metal element A, and an oxide and/or salt of the metal element B may be mixed in a predetermined ratio (see the examples given below).

There are no particular restrictions on how the plurality of types of metal compound (preferably in the form of particles) are mixed, but an example is to prepare a mixed powder by dry pulverization in a planetary mill. Alternatively, the desired mixed powder can also be obtained by wet pulverization in a ball mill or the like while a solvent such as water or isopropyl alcohol is added. Such powder pulverization and stirring methods are known to persons skilled in the art, and since they are not particular features of the present invention, they will not be described in detail.

With the powder manufacturing method of the present invention, a single mixed powder (mixed system) is formed by adding all of the plurality of types of metal compound (powder) for creating the desired multi-component metal oxide. In this case, a particle expanding step (discussed below) is performed after prefiring.

Alternatively, two or more types of mixed powder (mixed system) in a predetermined combination that produces no impurities may be formed from the plurality of types of metal compound particles used to create the desired multi-component metal oxide.

For instance, the following two mixed systems are produced for the multi-component metal oxide corresponding to General Formula a above.

(1) A mixed powder containing oxide particles of Ln (such as $La_2O_3$), oxide particles of the metal element C (such as $Fe_2O_3$), and an oxide and/or salt of the metal element B (such as $Ga_2O_3$), and containing substantially no oxide and/or salt of the metal element A (such as $SrCO_3$).

(2) A mixed powder containing an oxide particles of the metal element C (such as $Fe_2O_3$) and an oxide and/or salt of the metal element A (such as $SrCO_3$), and containing substantially no oxide particles of Ln (such as $La_2O_3$) (an oxide and/or salt of the metal element B may be contained, or no oxide and/or salt of the metal element B may be contained).

Separately prefiring two or more mixed systems in such a combination prevents the occurrence of impurities that could lead to a change in volume (expansion) during the main firing.

The mixed powder obtained as above is prefired. Here, a dehydration (solvent removal) step, drying step, crushing step, or the like may be performed if needed prior to this prefiring step. For instance, when the mixed powder is prepared by wet pulverization using a ball mill or the like, prefiring is generally preceded by dehydration (typically forced drying at a temperature of 100° C. or higher) and crushing. On the other hand, when the mixed powder is prepared by dry pulverization, prefiring can be performed without first performing this drying or crushing.

Just as with a conventional method for manufacturing a powder for forming an oxide ion conductor, the prefiring is typically performed by placing the mixed powder in a crucible or other such firing vessel. There are no particular restrictions on the prefiring temperature or duration, which may be suitably determined within the range of standard conditions according to the composition of the intended multi-component metal oxide. Typically, the prefiring is performed for several hours (1 to 3 hours) at 900 to 1300° C.

When two or more mixed systems are to be prepared, they are prefired separately as discussed above. The prefiring conditions (temperature, duration, etc.) may be suitably determined according to the compositions of the mixed systems. The targeted mixed prefired powder is prepared by blending these mixed systems in a predetermined ratio after prefiring. If the prefired powders stick together and form a clump, they may be crushed or pulverized as needed using a mortar, grinder, or the like.

Upon completion of the prefiring step (typically, after cooling to about room temperature), with a single mixed system, a treatment is performed in which the prefired powder is exposed to water or moist gas so that at least some of the particles in the powder are expanded (hereinafter also referred to as "particle expanding step").

There are no particular restrictions on the details of this step, as long as the impurities (such as lanthanum oxide) contained in the powder can be swollen in the presence of water. For instance, a heat drying treatment may be performed in a state in which the prefired powder is exposed to moist gas.

The moist gas here does not need to have any special gas composition, and may be air having an ordinary humidity (typically a relative humidity of 40 to 95%). An air or inert gas (such as nitrogen) with a comparatively high relative humidity (such as 60 to 100%, and preferably at least 80%) is preferable. In high-humidity air, either heating is performed or air drying is performed at room temperature. In the case of air drying, it is preferably continued for at least 24 hours (and preferably for 48 to 72 hours). In the case of heating, the preferred continuation time will vary with the temperature, but a heating treatment at about 50 to 200° C. would be continued for 8 to 12 hours, and preferably 12 to 24 hours, or at least 24 hours. The heating treatment is preferably continued until substantially no further change in weight is noted.

This particle expanding step need not be performed immediately after the prefiring, and may instead be performed immediately prior to the molding into the predetermined shape (that is, immediately prior to its being used as a molding material for manufacturing an oxide ion conductor of the predetermined shape).

Also, the prefired powder may be exposed to water (the powder may be wetted) in this particle expanding step. Examples of this treatment include wet stirring and wet pulverization using a ball mill, vibratory mill, or the like. For instance, the prefired powder is placed in a ball mill equipped with suitable ceramic balls, and is rotated for a predetermined length of time at a suitable speed. This allows moisture to be applied uniformly to the entire prefired powder. The prefired powder can be adjusted to the desired particle size by performing wet pulverization.

If this wet stirring is followed by a heating treatment or air drying treatment as discussed above, then it would be performed for long enough to wet the entire prefired powder. For instance, it can be performed for between 0.5 and several hours. Alternatively, if the impurities are subjected to a swelling reaction during the wet stirring (that is, if the above-mentioned heating treatment or air drying treatment is performed in process of the wet stirring), then the wet stirring would appropriately be performed for 6 to 72 hours (preferably 12 to 48 hours, and even more preferably 15 to 40 hours). The wet stirring (typically wet pulverization) may be performed either at room temperature or under heating (at 50 to 100° C., for example).

The above-mentioned particle expanding step is essential when a single mixed system of prefired powder is used, but this step may also be performed when using a plurality of prefired powders (mixed systems) produced by separately prefiring two or more mixed powders as discussed above. For instance, the wet stirring described above (such as with a ball mill) may be employed as the method for blending the two or more prefired powders (mixed systems), and then air drying or heating may be performed.

The raw material powder prepared as above, which has undergone expansion reaction prior to main firing, is used to manufacture an oxide ion conductor composed of a multi-component metal oxide.

There are no particular restrictions on the molding of this raw material powder and the firing (main firing) of the molded powder, which may be performed by conventional methods. For instance, uniaxial compression molding, hydraulic pressing, extrusion molding, or another standard method can be employed. A conventional binder or the like can be added for this molding. Components other than the main components of the oxide ion conductive multi-component metal oxide (such as the elements in the above general formula) can be contained to the extent that there is no pronounced decrease in the desired performance (oxygen conductivity, electron conductivity, etc.).

The temperature during the main firing will vary with the composition of the oxide ion conductor (multi-component metal oxide) and so forth, but is typically 1200 to 1800° C. (and preferably 1400 to 1700° C.).

The present invention will now be described in further detail through examples.

Examples 1 to 3 and Comparative Example 1 below are examples of the manufacture of a raw material powder for forming an oxide ion conductor with the composition represented by the general formula $(La_{0.7}Sr_{0.3})(Ga_{0.6}Fe_{0.4})O_3$.

EXAMPLE 1

Single Mixed System, Heating in Air (a) 23.13 g of $La_2O_3$, 8.98 g of $SrCO_3$, 11.41 g of $Ga_2O_3$, and 6.48 g of $Fe_2O_3$ were placed in a resin pot along with 400 g of resin balls (100 g of balls 10 mm in diameter, and 300 g of balls 20 mm in diameter), and mixed (dry pulverization) for 5 hours with a planetary mill. This prepared a mixed powder.

(b) This mixed powder was transferred to an alumina crucible and prefired for 3 hours at 1000° C.

(c) The prefired powder was placed in a resin pot along with 400 g of resin balls (100 g of balls 10 mm in diameter, and 300 g of balls 20 mm in diameter), and crushed for 30 minutes with a planetary mill.

(d) Next, a particle expanding step was performed in which this prefired powder was exposed to moist gas. Specifically, the crushed prefired powder was left for 24 hours in an 80° C. dryer (in an air atmosphere with a relative humidity of 40 to 95%). This manufactured a raw material powder.

EXAMPLE 2

Single Mixed System, Wet Pulverization (a) 101.4 g of $La_2O_3$, 39.38 g of $SrCO_3$, 50 g of $Ga_2O_3$, and 28.4 g of $Fe_2O$ and 28.4 g of $Fe_2O_3$ were placed in a resin pot (1000 cm³ size) along with 400 g of water and 300 g of YTZ balls with a diameter of 5 mm (trade name for zirconia-based ceramic balls made by Nikkato Corporation), and mixed (wet pulverization) for 15 hours with a ball mill. This prepared a mixed powder.

(b) This mixed powder was dehydrated by ordinary suction filtration. This product was transferred to a metal vat and dried in a 150° C. dryer, and crushed with a mortar.

(c) The crushed mixed powder was transferred to an alumina crucible and prefired for 3 hours at a temperature between 900 and 1250° C.

(d) The prefired powder was crushed with a mortar or grinder.

(e) Next, a particle expanding step was performed in which this prefired powder was exposed to water. Specifically, the crushed prefired powder was placed in a resin pot (100 cm³ size) along with 30 g of water and 30 g of YTZ balls, and crushed with a ball mill until the required particle size was obtained (15 to 40 hours here). This product was dehydrated by ordinary suction filtration, after which it was transferred to a metal vat, dried in a 150° C. dryer, and crushed with a mortar. This manufactured a raw material powder.

EXAMPLE 3

Preparation of a Plurality of Mixed Systems (a1) 101.4 g of $La_2O_3$, 50 g of $Ga_2O_3$, and 7.1 g of $Fe_2O_3$ were placed in a resin pot (1 liter size) along with 400 g of water and 300 g of YTZ balls with a diameter of 5 mm, and mixed (wet pulverization) for 15 hours with a ball mill. This prepared a first mixed powder (hereinafter referred to as "LGF powder").

(b1) The LGF powder thus prepared was dehydrated by ordinary suction filtration, transferred to a metal vat, dried in a 150° C. dryer, and crushed with a mortar.

(c1) The crushed LGF powder was placed in an alumina crucible and prefired for 1 hour at 1130° C.

(d1) The prefired LGF powder was crushed using a mortar or a grinder.

(a2) Meanwhile, 39.38 g of $SrCO_3$ and 21.3 g of $Fe_2O_3$ were similarly wet-pulverized to prepare a second mixed powder (hereinafter referred to as "SF powder").

(b2) The SF powder thus prepared was dehydrated by ordinary suction filtration, transferred to a metal vat, dried in a 150° C. dryer, and crushed with a mortar.

(c2) The crushed SF powder was placed in an alumina crucible and prefired for 1 hour at 1130° C.

(d2) The prefired SF powder was crushed using a mortar or a grinder.

(e) Next, the separately prefired and crushed LGF powder (full amount) and SF powder (full amount) were placed in a resin pot along with YTZ balls and water, and the LGF powder and SF powder were mixed while being crushed with a ball mill until the desired particle size was obtained (15 to 40 hours here). This product was dehydrated by ordinary suction filtration, transferred to a metal vat, dried in a 150° C. dryer, and crushed with a mortar. A raw material powder was manufactured in this way.

COMPARATIVE EXAMPLE 1

Single Mixed System, no Particle Expanding Step

A raw material powder was manufactured in the same manner as in Example 1, except that the particle expanding step was not performed.

Evaluation Test 1: Volumetric Change Caused by Heating the Raw Material Powder

Using the raw material powders manufactured in Examples 1 to 3 and Comparative Example 1, pellet type molded articles with a diameter of approximately 27.5 mm and a thickness of 2 to 2.5 mm were produced by press molding. These molded articles were heated for 24 hours in an 80° C. dryer (in an air atmosphere with a relative humidity of 40 to 95%). The diameter of the molded articles were measured before and after heating, and the change in the volume of the molded articles was evaluated from the change in diameter. The measurement results are given in Table 1.

TABLE 1

|  | Molded article diameter (mm) | |
| --- | --- | --- |
|  | Before heating | After heating |
| Example 1 | 27.53 | 27.53 |
| Example 2 | 27.56 | 27.56 |
| Example 3 | 27.51 | 27.51 |
| Comparative Example 1 | 27.52 | 31.75 |

As is clear from Table 1, there was substantially no change in the volume of the raw material powders manufactured by the method of the present invention (Examples 1 to 3) before and after heating. On the other hand, the volume of the raw material powder produced in Comparative Example 1 changed largely when heated. This revealed that the raw material powder of Comparative Example 1 contains a relatively large amount of particles that expand markedly when heated.

The main reasons that heating results in less volumetric change in the raw material powders of Examples 1 to 3 will now be described. In Examples 1 and 2, the prefired powder was subjected to a particle expanding step. As a result, it is believed that any impurities contained in the prefired powder and that could undergo a volumetric change when heated ($La_2O_3$ in this case) had almost already undergone a expansion reaction prior to the main firing during the manufacture of the raw material powder. In Example 3, an LGF powder and an SF powder were prefired separately, after which the two powders were mixed. This is believed to have prevented the production of any impurities that could undergo a volumetric change when heated.

Figure 2:
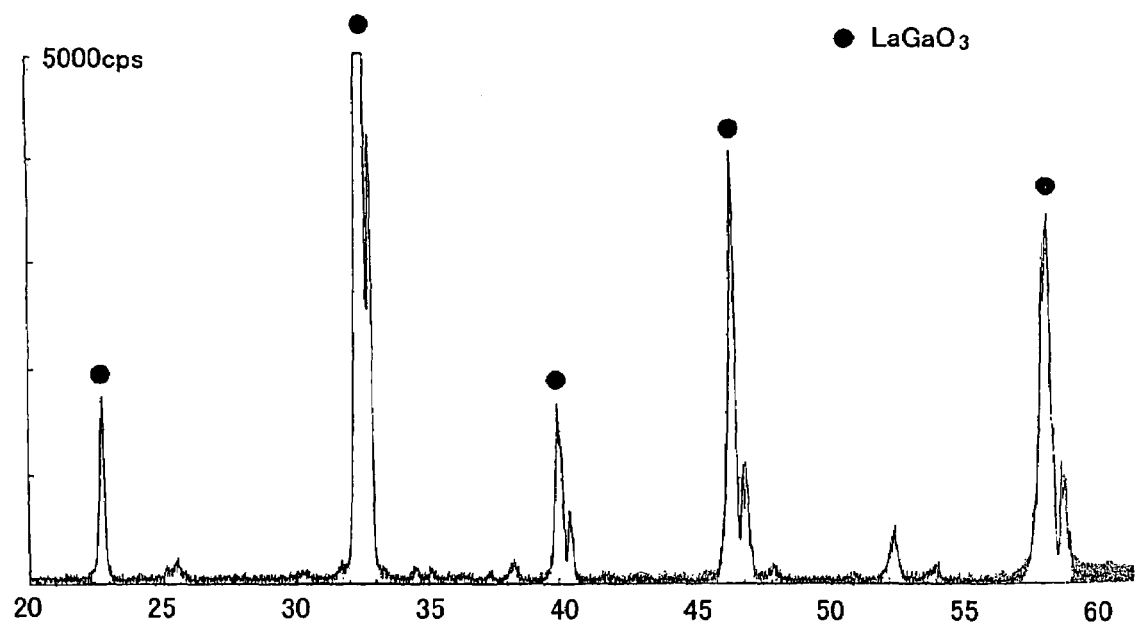
FIG. 2 is a chart showing the results of XRD analysis of the raw material powder of Example 3.

The raw material powders manufactured in Example 3 and Comparative Example 1 were also subjected to XRD analysis. The analysis results for Comparative Example 1 are given in FIG. 1, and those for Example 3 in FIG. 2. FIG. 1 shows peaks indicating $La_2O_3$ (labeled with a □ mark in FIG. 1). This tells us that the raw material powder manufactured in Comparative Example 1 contained $La_2O_3$ as an impurity. Meanwhile, FIG. 2 shows no peaks indicating $La_2O_3$. This tells us that the raw material powder manufactured in Example 3 contained substantially no $La_2O_3$.

Evaluation Test 2: Evaluation of Oxide Ion Conductor Obtained by Firing the Raw Material Powder Using the raw material powders manufactured in Examples 1 to 3 and Comparative Example 1, pellet type molded articles were produced in the same manner as in Evaluation Test 1. These molded articles were fired for 6 hours at 1500° C. to manufacture an oxide ion conductor molded in the form of pellets.

The oxide ion conductors thus obtained were visually checked for cracks. Also, the fired pellets were cut into a quadrangular shape (10 mm×20 mm), and the conductivity σ (S/cm) of the oxide ion conductor was measured by the following method.

Conductivity Measurement Method

The surface of the oxide ion conductor was coated with a platinum paste (serving as an electrode), after which a platinum wire was connected and baked on at 850 to 1100° C. The conductivity σ (S/cm) was found by measuring the resistance of this oxide ion conductor at 800° C.

Table 2 shows whether any cracks developed and the results of measuring conductivity for the oxide ion conductor manufactured from each of the raw material powders.

TABLE 2

|  | Cracks | Conductivity σ (S/cm) |
| --- | --- | --- |
| Example 1 | no | 3.14 |
| Example 2 | no | 5.52 |
| Example 3 | no | 5.10 |
| Comparative Example 1 | yes | could not be measured |

As shown in Table 2, no cracks were seen in any of the oxide ion conductors obtained from the raw material powders manufactured in Examples 1 to 3. These oxide ion conductors also exhibited good conductivity. On the other hand, there were cracks in the oxide ion conductor obtained from the raw material powder manufactured in Comparative Example 1, and the conductivity could not be measured. This indicates that the raw material powders obtained by the manufacturing methods of Examples 1 to 3 are favorable as raw material powders for forming an oxide ion conductor (and particularly the above-mentioned mixed conductors).

In Reference Examples 1 to 3 below, a raw material powder for forming an oxide ion conductor composed of a multi-component metal oxide substantially constituted by oxygen and two or more metal elements including lanthanum were manufactured by conventional methods, these raw material powders were molded, and the change in their volume after heating was evaluated.

REFERENCE EXAMPLE 1

Using various metal compounds of La, A (Sr, Ca, or Ba), Ti, and Fe in ratios such that the molar ratios of the various metal elements were as shown in Tables 3 to 5, raw material powders (Samples 1 to 18) for obtaining multi-component metal oxides of various compositions represented by the general formula $(La_{1-x}A_x)(Ti_{1-y}Fe_y)O_3$ (where A is Sr, Ca, or Ba, x is 0.1 to 0.9, and y is 0.1 to 0.9) were manufactured in the same manner as in Comparative Example 1 (that is, without performing a particle expanding step).

For each of these raw material powders, the diameter of the molded articles before and after heating (for 24 hours at 80° C. in an air atmosphere) was measured in the same manner as in Evaluation Test 1. The result was used to evaluate the change in volume of the molded articles. The measurement results are given in Tables 3 to 5.

TABLE 3

| Sample No. | Metal element composition (molar ratio) | | | | Diameter of molded articles (mm) | |
| --- | --- | --- | --- | --- | --- | --- |
|  | La | Sr | Ti | Fe | Before heating | After heating |
| 1 | 0.1 | 0.9 | 0.9 | 0.1 | 27.5 | 27.5 |
| 2 | 0.5 | 0.5 | 0.1 | 0.9 | 27.53 | 27.56 |
| 3 | 0.5 | 0.5 | 0.9 | 0.1 | 27.51 | 27.53 |
| 4 | 0.7 | 0.3 | 0.1 | 0.9 | 27.53 | 31.25 |
| 5 | 0.9 | 0.1 | 0.1 | 0.9 | 27.5 | 32.68 |
| 6 | 0.9 | 0.1 | 0.9 | 0.1 | 27.52 | 32.81 |

TABLE 4

| Sample No. | Metal element composition (molar ratio) | | | | Diameter of molded articles (mm) | |
|---|---|---|---|---|---|---|
| | La | Ba | Ti | Fe | Before heating | After heating |
| 7 | 0.1 | 0.9 | 0.1 | 0.9 | 27.52 | 27.56 |
| 8 | 0.1 | 0.9 | 0.9 | 0.1 | 27.51 | 27.54 |
| 9 | 0.5 | 0.5 | 0.1 | 0.9 | 27.5 | 27.53 |
| 10 | 0.5 | 0.5 | 0.9 | 0.1 | 27.53 | 27.54 |
| 11 | 0.9 | 0.1 | 0.1 | 0.9 | 27.51 | 33.14 |
| 12 | 0.9 | 0.1 | 0.9 | 0.1 | 27.54 | 33.46 |

TABLE 5

| Sample No. | Metal element composition (molar ratio) | | | | Diameter of molded articles (mm) | |
|---|---|---|---|---|---|---|
| | La | Ca | Ti | Fe | Before heating | After heating |
| 13 | 0.1 | 0.9 | 0.1 | 0.9 | 27.54 | 27.54 |
| 14 | 0.1 | 0.9 | 0.9 | 0.1 | 27.52 | 27.53 |
| 15 | 0.5 | 0.5 | 0.1 | 0.9 | 27.52 | 27.57 |
| 16 | 0.5 | 0.5 | 0.9 | 0.1 | 27.55 | 27.58 |
| 17 | 0.9 | 0.1 | 0.1 | 0.9 | 27.54 | 33.16 |
| 18 | 0.9 | 0.1 | 0.9 | 0.1 | 27.52 | 32.94 |

As is clear from Tables 3 to 5, with a composition in which the value of x in the general formula $(La_{1-x}A_x)(Ti_{1-y}Fe_y)O_3$ is relatively small (that is, the molar ratio of La is relatively high), the volumetric change (expansion) of the molded article after heating is particularly large. Therefore, using a raw material powder obtained by the powder manufacturing method of the present invention becomes very significant in the manufacture of an oxide ion conductor composed of a multi-component metal oxide with such a composition (particularly when x=0.1 to 0.3). A tendency for heating to cause volumetric expansion is seen even with compositions in which the value of x is relatively large, and applying the manufacturing method of the present invention to such compositions (such as those in which $0.3<x\leq0.9$) suppresses cracking.

REFERENCE EXAMPLE 2

Using various metal compounds of La, Sr, Ti, Mg, and Co in ratios such that the molar ratios of the various metal elements were as shown in Table 6, raw material powders (Samples 19 to 22) for obtaining multi-component metal oxides of various compositions represented by the general formula $(La_{1-x}Sr_x)(Ti_{z1}Mg_{z2}Co_y)O_3$ (where z1+z2=1-y, x=0.2 to 0.7, and y=0.35 to 0.6) were manufactured in the same manner as in Comparative Example 1 (that is, without performing a particle expanding step). The composition of these multi-component metal oxides corresponds to when Ln=La, A=Sr, B1=Ti, B2=Mg, and C=Co in the general formula $(Ln_{1-x}A_x)(B1_{z1}B2_{z2}C_y)O_3$.

For each of these raw material powders, the diameter of the molded articles before and after heating (for 24 hours at 80° C. in an air atmosphere) was measured in the same manner as in Evaluation Test 1. The result was used to evaluate the change in volume of the molded articles. The measurement results are given in Table 6.

TABLE 6

| Sample No. | Metal element composition (molar ratio) | | | | | Diameter of molded articles (mm) | |
|---|---|---|---|---|---|---|---|
| | La | Sr | Ti | Mg | Co | Before heating | After heating |
| 19 | 0.3 | 0.7 | 0.65 | 0.265 | 0.085 | 27.53 | 27.54 |
| 20 | 0.4 | 0.6 | 0.6 | 0.315 | 0.085 | 27.49 | 27.51 |
| 21 | 0.6 | 0.4 | 0.5 | 0.415 | 0.085 | 27.52 | 27.53 |
| 22 | 0.8 | 0.2 | 0.4 | 0.515 | 0.085 | 27.63 | 33.82 |

As is clear from Table 6, heating caused volumetric expansion in all of the Samples 19 to 22. Pronounced volumetric expansion was seen with Sample 22 in which the value of x was relatively small (x=0.2). The present invention can be favorably applied to the manufacture of an oxide ion conductor composed of a multi-component metal oxide with a composition such as this (particularly when x is 0.2 or less).

REFERENCE EXAMPLE 3

Using various metal compounds of La, Sr, Ga, Ti, Mg, Co, and Fe in ratios such that the molar ratios of the various metal elements were as shown in Table 7, raw material powders (Samples 23 and 24) for obtaining multi-component metal oxides of various compositions represented by the general formula $(La_{1-x}Sr_x)(B1_{z1}Mg_{z2}C_y)O_3$ (where B1 is Ga or Ti, is Co or Fe, z1+z2=1-y, x=0.2, and y=0.115 to 0.15) were manufactured in the same manner as in Comparative Example 1 (that is, without performing a particle expanding step). The composition of these multi-component metal oxides corresponds to when Ln=La, A=Sr, B1=Ga or Ti, B2=Mg, and C=Fe or Co in the general formula $(Ln_{1-x}A_x)(B1_{z1}B2_{z2}C_y)O_3$.

For each of these raw material powders, the diameter of the molded articles before and after heating (for 24 hours at 80° C. in an air atmosphere) was measured in the same manner as in Evaluation Test 1. The result was used to evaluate the change in volume of the molded articles. The measurement results are given in Table 7.

TABLE 7

| Sample No. | Metal element composition (molar ratio) | | | | | | | Diameter of molded articles (mm) | |
|---|---|---|---|---|---|---|---|---|---|
| | La | Sr | Ga | Ti | Mg | Co | Fe | Before heating | After heating |
| 23 | 0.8 | 0.2 | 0.8 | — | 0.115 | 0.085 | — | 27.51 | 32.92 |
| 24 | 0.8 | 0.2 | — | 0.8 | 0.15 | — | 0.05 | 27.5 | 34.87 |

As is clear from Table 7, heating caused pronounced volumetric expansion in both of the Samples 23 and 24. The present invention can be favorably applied to the manufacture of an oxide ion conductor composed of a multi-component metal oxide with a composition such as this (particularly when x is 0.2 or less).

Specific examples of the present invention were described in detail above, but these are merely examples, and do not serve to limit the scope of the claims. The technology discussed in the claims encompasses various modifications and changes to the specific examples given above.

Also, the technological elements described in this Specification and Drawings exhibit technical usefulness either alone or in various combinations, and are not limited to the combinations given in the claims at the time of application. Also, the technology illustrated in this Specification and Drawings simultaneously achieves a plurality of objects, and achieving any one of these has technical usefulness by itself.

The invention claimed is:

1. A method for manufacturing a raw material powder for molding an oxide ion conductor composed of a multi-component metal oxide represented by the following general formula:

$$(Ln_{1-x}A_x)(B_{1-y}Fe_y)O_3$$

where Ln is at least one selected from the group consisting of lanthanum and lanthanides, A is at least one selected from the group consisting of Sr, Ca, and Ba, B is at least one selected from the group consisting of Ga, Ti, Ni, Cu, Co, and Mg, $0<x<1$, and $0\leq y\leq 1$, the method comprising:

preparing a mixed powder composed of metal compounds so as to contain an oxide of Ln; an oxide of Fe if needed; an oxide and/or salt of the metal A; and an oxide and/or salt of the metal B if needed;

prefiring said powder; and expanding at least some particles in said prefired powder by exposing said prefired powder to moist gas and by heating at about 50 to 200° C. until there is substantially no further change in the weight of said prefired powder in moist gas.

2. The manufacturing method according to claim 1, wherein, the value of y in the general formula is more than 0 and less than 1.

3. The manufacturing method according to claim 1, wherein, in the general formula, Ln is La, A is Sr, and B is Ga or Ti.

* * * * *